United States Patent
Kung et al.

(10) Patent No.: US 12,058,207 B2
(45) Date of Patent: Aug. 6, 2024

(54) LOAD BALANCING AND SECURE TUNNELING FOR CLOUD-BASED NETWORK CONTROLLERS

(71) Applicant: Ruckus IP Holdings LLC, Claremont, NC (US)

(72) Inventors: Yu-Cheng Kung, Taipei (TW); Chien-Hua Chen, Taipei (TW)

(73) Assignee: Ruckus IP Holdings LLC, Claremont, NC (US)

( * ) Notice: Subject to any disclaimer, the term of this patent is extended or adjusted under 35 U.S.C. 154(b) by 338 days.

(21) Appl. No.: 17/582,444

(22) Filed: Jan. 24, 2022

(65) Prior Publication Data
US 2022/0239632 A1 Jul. 28, 2022

Related U.S. Application Data

(60) Provisional application No. 63/141,143, filed on Jan. 25, 2021.

(51) Int. Cl.
*H04L 67/1031* (2022.01)
(52) U.S. Cl.
CPC .................. *H04L 67/1031* (2013.01)
(58) Field of Classification Search
CPC ....... H04L 63/20; H04L 43/045; H04L 43/10; H04L 67/1031; G06F 9/5077
See application file for complete search history.

(56) References Cited

U.S. PATENT DOCUMENTS

| | | | |
|---|---|---|---|
| 10,531,476 B2* | 1/2020 | Rost | H04L 41/122 |
| 11,196,628 B1* | 12/2021 | Shen | H04L 41/0893 |
| 2019/0007236 A1* | 1/2019 | Ishii | H04L 12/4633 |
| 2019/0173840 A1* | 6/2019 | Desai | H04L 67/56 |
| 2020/0162385 A1* | 5/2020 | Thiagarajan | H04L 45/74 |
| 2021/0099386 A1* | 4/2021 | Goel | H04L 67/10 |
| 2021/0099532 A1* | 4/2021 | Goel | H04L 67/1001 |
| 2022/0038368 A1* | 2/2022 | Shen | H04L 45/02 |
| 2022/0038501 A1* | 2/2022 | Shen | G06F 9/5077 |

OTHER PUBLICATIONS

Qi et al., "Understanding Container Network Interface Plugins: Design Considerations and Performance", IEEE International Symposium on Local and Metropolitan Area Networks, Jul. 13, 2020, IEEE Poblishing.*

(Continued)

*Primary Examiner* — Todd L Barker
(74) *Attorney, Agent, or Firm* — Myers Bigel, P.A.

(57) ABSTRACT

Methods, systems, and devices for using secured tunnels (e.g., SSH tunnels), for example with microservices-based architectures and/or operating-system level virtualization technologies, An example method may include receiving, by a secured tunnel server and via a secured tunnel, network traffic intended for a first original destination of the plurality of original destinations; selecting, using a plurality of override rules that indicate mappings between a plurality of original destinations and respective override destinations, an override destination for the network traffic intended for the first original destination; and forwarding, by the secured tunnel server, the network traffic to the override destination.

13 Claims, 10 Drawing Sheets

(56) References Cited

OTHER PUBLICATIONS

Dzogovic et al., "Connecting Remote eNodeB with Containerized C-RANs in OpenStack Cloud", IEEE International Conference on Cyber Security and Cloud Computing,, Jun. 21, 2019.*

Feng et al., "Building virtualized 5G networks using open source software", IEEE Symposium on Computer Appicatoins & Industrial Electronics, Apr. 28, 2018.*

Vidal et al., "A Multi-Site NFV TEstbed for Experimentaion With SUAV-Based 5G Vertical Services", IEEE Access, Jun. 12, 2020.*

* cited by examiner

LOAD BALANCING AND SECURE TUNNELING FOR CLOUD-BASED NETWORK CONTROLLERS

CROSS-REFERENCE TO RELATED APPLICATION

The present application claims the benefit of priority of U.S. Provisional Application No. 63/141,143, filed on Jan. 25, 2021, and the entire contents of the above-identified application are incorporated by reference as if set forth herein.

TECHNICAL FIELD

The present disclosure is related to networking systems, and in particular relates to load balancing and secure tunneling for cloud-based network controllers in networking systems.

BACKGROUND

Software development and deployment has undergone and continues to undergo significant changes, in large part due to the increasing access and availability of communications networks such as the Internet. Two areas of increasing focus have been in the development and deployment of microservices-based architectures, and the development of operating system-level virtualization technologies.

With respect to the first area of focus and the development and deployment of microservices-based architectures, historically many software products, including some Software-as-a-Service (SaaS) products and web applications, have been developed and deployed using a monolithic architecture, in which all business logic components are bundled into a single application. One example of a monolithic architecture for a web application is shown in FIG. 1A. As seen in FIG. 1A, in a monolithic architecture 10, a user-facing browser 15 may communicate with a web server 20, which may facilitate requests to and responses from a web application 30 that includes frontend components 31 (e.g., user interface components) and backend components 32 (e.g., business logic components). Each of the backend components 32 may access data stored in a data store 33, which may be e.g., a relational database.

Monolithic architectures have some advantages, such as being relatively simple to develop and deploy, especially for relatively small web applications and relatively small engineering teams. However, as a web application or SaaS product grows in complexity and code base size, development agility and deployment agility are reduced. For example, software developers and/or functional teams must coordinate release schedules for new versions of the monolithic web application, creating a potential bottleneck. Additionally, deploying an update to a monolithic web application typically requires redeployment of the entire web application, which may result in downtime or state errors. Furthermore, monolithic applications scale by running or instantiating additional instances (copies) of the web application and using a load balancer or reverse proxy (for example, at the web server 20) to distribute traffic across the instances. This can result in inefficient usage of computing resources, for example when different backend components 32 have different resource requirements.

To address some of the drawbacks of monolithic architectures, some organizations are implementing a microservices-based architecture, in which individual business logic components are implemented as separate services (or microservices) that communicate using a standard typically lightweight protocol, such as a REST (representational state transfer) API (application programming interface). A microservices-based architecture is shown in FIG. 1B.

In the microservices-based architecture 50 of FIG. 1B, a user-facing browser 65 may communicate with a web server or load balancer 70 (which may be a reverse proxy), which may facilitate requests to and responses from a frontend component service 81. The frontend component service may be deployed as a lightweight web application 80. The frontend components service 81 may communicate using a protocol with backend component services 82, each of which may have a corresponding data store 83. The layout and communication of the microservices-based architecture 50 shown in FIG. 1B is merely an example, and other topologies and communication flows are possible. For example, some architecture may include multiple tiers, in which frontend components speak with a first backend component (or layer of backend components), which in turn facilitates communication with a second backend component (e.g., without the frontend component communicating directly with the second backend component).

A microservices-based model may enable more rapid deployment of improvements, enhancements, and corrections to each individual business logic or service. For example, some organizations may maintain a one-to-one or one-to-few mapping between engineering teams and microservices, with each engineering team responsible for developing, testing, deploying, and scaling its respective service or services independently of other engineering teams. Another favorable benefit of microservices architecture is that each microservice may be horizontally scalable. For example, an instance of an order service within an e-commerce website may be configured to receive orders from a frontend component, transmit payment information to a payment processing service, update an inventory database, and communicate the order to a fulfillment service that supports the packaging or shipping of the product. During busy times such as the winter holiday season, an increased number of orders may be received. To facilitate the increased load, additional instance of the order service may be instantiated (either manually or programmatically) and orders may be distributed to either the first (e.g., original) instance or the second instance. Each of the instances may communicate with a single inventory database to ensure that product stock is accurately reflected (e.g., to avoid overselling the product).

With respect to the second area of focus and the development of operating system-level virtualization, computer hardware has gotten exponentially more powerful over the past several decades. Early application deployment strategies typically involved dedicated hardware resources (e.g., physical servers) for each application, which would result in underuse of the hardware. This facilitated the development and adoption of virtualization techniques, which enable a single hardware server to execute several applications while maintaining reliability. Virtualization software creates an abstraction layer that enables hardware elements, such as processors, memory, and storage to be divided into multiple system virtual machines (VMs). In full virtualization (or system virtualization), each VM runs its own operating system. To applications and end users, the behavior of a VM is comparable to a dedicated computer.

In many instances, each VM runs one application to improve reliability and uptime. Although this is more efficient than non-virtualization, the result is some unnecessary duplication of code (particularly operating system code) and services for each application run by the organization. Additionally, development and deployment in VM presents an additional layer in which software defects and errors can arise. For example, a developer may transfer code from a desktop computer to a virtual machine (VM) and/or from a first operating system to a second operating system, and the different configurations may result in deployment errors.

To address these inefficiencies, operating-system level virtualization technologies have been developed in which application code and its dependencies are bundled together in a single package. This package is often called a container and referred to as such herein, although specific nomenclature may be implementation-dependent. A container is packaged so as to be independent of the operating system on which the container is run, and hence can be run uniformly and consistently on any infrastructure. Multiple containers may be run on a single hardware instance or a single VM, and may share the host's operating system kernel. Stated differently, multiple containers may be run by a single operating system kernel. As such, containers avoid the association of an operating system with each application. Containers are inherently smaller than VMs and require less start-up time, allowing more containers to run on the same hardware capacity as a single VM. One set of products that provide operating-system level virtualization services and/or container services is Docker.

In addition to containers themselves (e.g., containers as a way to facilitate the development and deployment of software), there is interest in orchestration platforms and systems, which may automate the management, deployment, and scaling of containers. One set of products and systems that provide such orchestration is Kubernetes. Using Kubernetes as an example, various computing devices (nodes) within a cluster may be in communication with a master or primary of the cluster. The master and nodes work together to ensure that a desired number of a pod (which is a grouping of containerized components guaranteed to be located with each other) are available across the nodes.

SUMMARY

Some embodiments of the inventive concepts may promote increased adoption of microservices-based architectures and/or operating-system level virtualization technologies, and may result in increased network efficiency, increased resource utilization, and decreased time to develop software features for cloud-based controllers of network devices, such as switches and/or access points.

Some aspects of the present disclosure provide methods, including a method comprising: receiving, by a secured tunnel server and via a secured tunnel, network traffic intended for a first original destination of the plurality of original destinations; selecting, using a plurality of override rules that indicate mappings between a plurality of original destinations and respective override destinations, an override destination for the network traffic intended for the first original destination; and forwarding, by the secured tunnel server, the network traffic to the override destination.

In some aspects, the original destination is indicated by an original target name and an original target port and each respective override destination is indicated by an override target name and an override target port. For example, at least one override target name may indicate a service. In some aspects, at least one override target name indicates a plurality of potential destinations corresponding to the first original destination, and selecting the override destination for the network traffic intended for the first original destination may include selecting among the potential destinations.

In some aspects, the mapping between the plurality of original destinations and respective override destinations may further indicate an algorithm, and wherein selecting the override destination for the network traffic intended for the first original destination comprises selecting among the potential destinations using the indicated algorithm. For example, selecting, using the plurality of override rules, an override destination for the network traffic intended for the first original destination may include selecting among the potential destinations randomly.

In some aspects, the method may include receiving, by the secured tunnel server, data regarding a current status of each of the potential destinations, and selecting the override destination for the network traffic intended for the first original destination may include selecting among the potential destinations using the received data. The received data regarding the current status of each of the potential destinations may include processor usage data, and selecting the override destination for the network traffic intended for the first original destination may include selecting a destination having a lowest processor usage from among the potential destinations.

In some aspects, the received data regarding the current status of each of the potential destinations may include memory usage data, and selecting the override destination for the network traffic intended for the first original destination may include selecting a destination having a lowest memory usage from among the potential destinations.

In some aspects, each potential destination may be or include a containerized software component. In some aspects, each potential destination may include a group of containerized software components, and each containerized software component of the group may be run by a common operating system kernel.

In some aspects, the secured tunnel server may be operating as a containerized software component. As an example, the secured tunnel server may operating as a first containerized software component, and the plurality of override rules may be received from a second containerized software component. In some aspects, the first and second containerized software components may be run by a common operating system kernel.

In some aspects, the network traffic intended for the first original destination may be received from a wireless access point.

In some aspects, the network traffic intended for the first original destination may include control plane network traffic.

Another example of a method provided by the present disclosure includes: instantiating an instance of a first containerized software component within an orchestrated cluster, where the first containerized software component is configured to provide a secured tunnel server; instantiating a plurality of instances of a second containerized software component within the orchestrated cluster; receiving, by the secured tunnel server and via a secured tunnel, network traffic intended for a first original destination; selecting, based on a plurality of override rules, an override destination for the network traffic intended for the first original destination, where selecting the override destination for the network traffic intended for the first original destination comprises selecting one of the plurality of instances of the second containerized software component within the orchestrated cluster; and forwarding, by the secured tunnel server, the network traffic to the selected override destination.

Another example of a method provided by the present disclosure includes: operating an orchestrated cluster comprising a plurality of containerized software components, wherein the plurality of containerized software components includes at least one instance of a first containerized software component that is configured to provide a secured tunnel server and a plurality of instances of a second containerized software component configured to control and/or manage wireless access points; receiving, by the secured tunnel server and via a secured tunnel, first network traffic from a wireless access point addressed to a port on the secured tunnel server; selecting, based on a plurality of override rules, one of the instances of the second containerized software component for the first network traffic; and forwarding, by the secured tunnel server, the first network traffic to the selected one of the instances of the second containerized software component.

The foregoing descriptions of some aspects of the present disclosure have been presented for purposes of illustration and description only. They are not intended to be exhaustive or to limit the present disclosure to those disclosed. Many modifications and variations of the inventive concepts, as well as many different embodiments, are described in greater detail herein.

BRIEF DESCRIPTION OF THE FIGURES

Note that like reference numerals refer to corresponding parts throughout the drawings. Moreover, multiple instances of the same part may be designated by a common prefix separated from an instance number by a dash.

DETAILED DESCRIPTION

Some computing systems of interest are networking systems in which hardware and/or software-based controllers are used in installing, setting up, troubleshooting, managing and configuring access points (APs) in a wireless network.

Figure 1A:
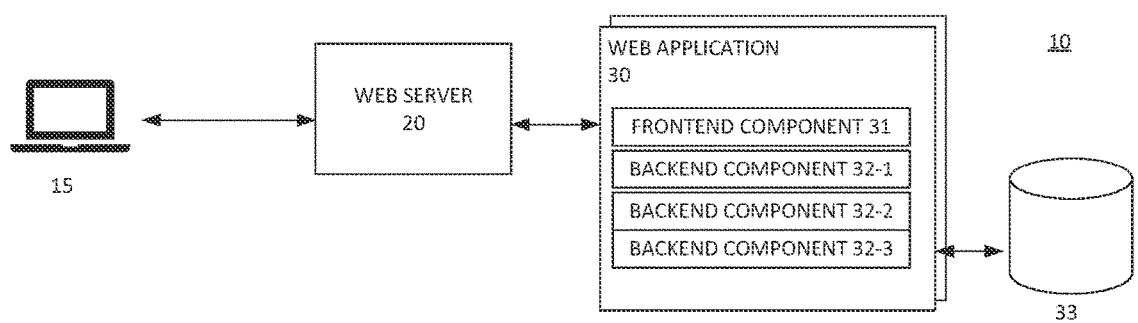
FIG. 1A is a block diagram illustrating aspects of a monolithic architecture for a web-based application.
Figure 1B:
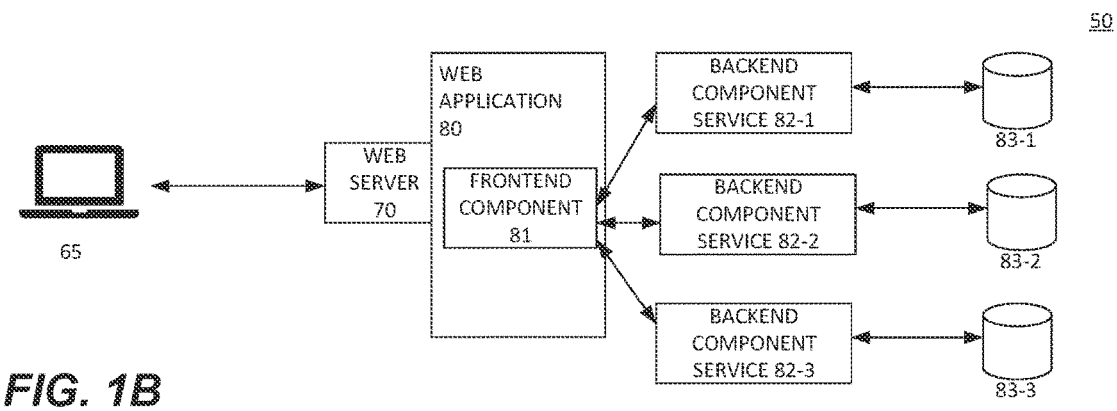
FIG. 1B is a block diagram illustrating aspects of a microservices-based architecture for a web-based application.
Figure 2:
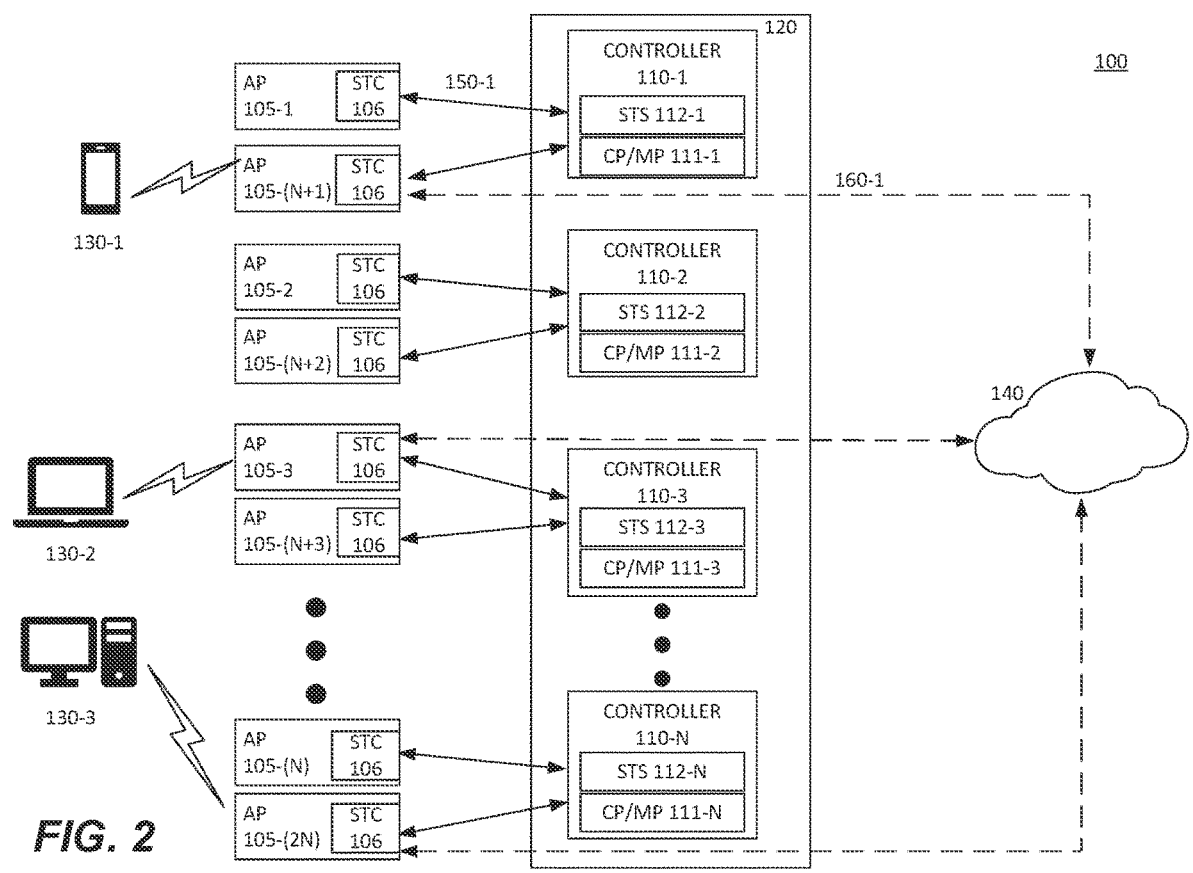
FIG. 2 is a block diagram illustrating aspects of a networking system.

FIG. 2 illustrates an example networking system 100 that facilitates access by a plurality of user devices 130 to a network 140 and that includes a collection 120 of network controllers 110-1 to 110-N in communication with a plurality of access points 105-1 to 105-2N. In some embodiments, a larger or smaller number of network controllers 110 may be present in the collection 120 (e.g., one, two, or more than two) than are illustrated in FIG. 2. Various aspects of the collection 120 and of the controllers 110 are not shown in FIG. 2 for ease of illustration. For example, one controller 110 may be designated as a master controller that coordinates the overall functioning of the controllers 110 of the collection 120. The controllers 110 may communicate with each other and/or the master controller may communicate with the non-master controllers using communication links that are not depicted in FIG. 2. In some embodiments, although not shown in FIG. 2, the collection 120 of controllers 110 may be a primary collection comprising a plurality of primary controllers, and the networking system 100 may also include a backup collection (not shown) comprising a plurality of backup controllers for redundancy.

The controllers 110 of FIG. 2 may be implemented in a variety of hardware and/or software formats. For example, the controllers 110 may be implemented as a separate hardware appliances. As another example, one or more of the controllers 110 may be implemented using virtual machines, such as process virtual machines that execute versions of software in a platform-independent environment. Alternatively or additionally, the virtual machines may include system virtual machines (which are sometimes referred to as "full virtualization virtual machines") that emulate a physical machine including one or more operating systems, and that can provide multiple partitioned environments or containers that are isolated from one another, yet exist on the same physical machine (such as a computer or a server). Each controller 110 may be implemented as a virtualized software-based controller that runs within a virtual machine. Each controller 110 may be installed at a respective site or location (e.g., one office building or branch location), or a plurality of controllers 110 may be installed in a centralized data center.

The access points 105 may include various hardware and/or software that permits the network-enabled computing devices 130 (which may be, as examples, smartphones, laptops, desktops, refrigerators, cameras, and the like) to connect and communicate with the network 140. A number of access points 105 may be deployed in order to provide, for example, a large and continuous coverage area for customers, employees, devices, equipment, and so on. The access points 105 and electronic devices 130 may communicate via wireless communication using, for example, radios therein (not shown). For example, each access point 105 includes one or more radios and one or more antennas that communicate packets in accordance with a communication protocol, such as an Institute of Electrical and Electronics Engineers (IEEE) 802.11 standard (which is sometimes referred to as 'Wi-Fi,' from the Wi-Fi Alliance of Austin, Tex.), Bluetooth (from the Bluetooth Special Interest Group of Kirkland, Wash.), and/or another type of wireless interface. In the discussion that follows, Wi-Fi is used as an illustrative example. However, a wide variety of communication protocols may be used. Examples of communication between the access points 105 and the one or more of electronic devices 130 may include: transmitting advertising frames on wireless channels, detecting one another by scanning wireless channels, exchanging subsequent data/management frames (such as association requests and responses) to establish a connection, negotiating and configuring security options (e.g., Internet Protocol Security), and transmitting and receiving frames or packets via the connection (which may include the association requests and/or additional information as payloads), and so on. Again, for ease of illustration FIG. 2 may omit additional components or electronic devices 130 present within the networking system 100, such as a router.

Each access point 105 may be configured when it is first installed at a customer location or site before it may serve electronic devices 130 within a coverage area of the access point 105. Additionally, each access point 105 may be configured and/or re-configured on an ongoing basis by the controllers 110 of the collection 120. This configuration may include communication of configuration requests (that include configuration information) by the access point 105 with at least one of the controllers 110 in the collection 120. This configuration may also include configuration responses, commands, instructions, or the like, transmitted from the controller 110 to the access point 105, with the configuration commands being generated either programmatically or responsive to user input from a network operator. In some embodiments, traffic between the access point 105 may be separated into various "planes," such as a data plane comprising user traffic and the like; a control plane comprising routing protocols and network topology information, control and management of communication between the access point 105 and the electronic devices 130, and the like; and a management plane, which may include device configuration information and the like. Accordingly, the controller 110 may configure the access point 105 via the control plane and/or the management plane. In some embodiments, the controllers 110 may provide or facilitate additional services, such as location-based services, data archiving, analysis, reporting, etc. For example, the controllers 110 may include one or more: database computers or servers that store data for the customers, application computers or servers that execute customer applications, web servers that provide web pages, monitoring computers or servers that monitor or track activity by the users of access points 105 and/or electronic devices 130.

During the initial installation and configuration process, each access point 105 may establish a link with a controller 110 of the collection 120. The collection 120 and/or the controllers 110 thereof may provide load balancing between the controllers 110. For example, the access point 105 may request to establish a connection with a controller 110 of the collection 120 by contacting a network address (e.g., Internet Protocol (IP) address) and/or receiving a list of controllers 110, for example from a master controller 110 of the collection 120. The master controller 110 (or other device) may rotate through a list of network addresses of the controllers 110 of the collection 120. As each access point 105 typically attempts to establish a connection with the first listed controllers 110 in the list of controllers that the access point receives, the result of the rotation or reordering of the controllers 110 results in a plurality of access points 105 contacting the plurality of controllers 110 in a round-robin fashion.

For example, when a first access point 105-1 retrieves the list, a first controller 110-1 may be listed first in the list, followed by the second controller 110-2, third controller 110-3, and so on until the Nth controller 110-N (where N is a natural number). In some embodiments, only the network address of the first controller 110-1 may be returned. The first access point 105-1 may contact the first controller 110-1 via the network address thereof and attempt to form a connection between the first access point 105-1 and the first controller 110-1. Subsequently, a second access point 105-2 may request the list of controllers 110, and the master controller 110 (or other device) may modify the list such that the second controller 110-2 is listed first, followed by the third controller 110-3, and so on, with the address of the first controller 110-1 last in the list. Again, in some instances only the network address of the second controller 110-2 may be returned to the second access point 105-2. Each access point 105-1 and 105-2 will traverse the respective list received by the access point 105 and attempt to establish a communication link with a controller 110 in the list. Although round-robin is a common example of load balancing, other mechanisms for load balancing are within the scope of the present disclosure and may be used. For example, in some embodiments, the list of controllers 110 may remain constantly-ordered, and each access point 105 may be configured to randomly select from among the controllers 110 on the list.

Once a communication link 150 between an access point 105 and a controller 110 is established, traffic may be communicated therebetween. The traffic may include control plane traffic and/or management plane traffic. In some embodiments, data plane traffic may also be communicated between the access point 105 and the controller 110 for forwarding to the network 140, depending on the configuration and topology of the networking system 100. In some embodiments, data plane traffic may be communicated from the access point 105 to another device for forwarding to the network 140. For example, as shown in FIG. 2, the control plane and/or management plane traffic may be transmitted on communication links 150, which are illustrated as solid lines, and data plane traffic may be transmitted on communication links 160, which are illustrated as dashed lines.

In the networking system of FIG. 2, each communication link 150 established between an access point 105 and a controller 110 may be a relatively long-lasting communication link or tunnel, and each communication link 150 may be an encrypted or secure communication link or tunnel. The communication link 150 may be relatively long-lasting in order to facilitate the delivery of control plane and management plane traffic over time. Constantly establishing and/or tearing down connections between the access points 105 and the controllers to deliver portions of the control and management traffic over time may create unnecessary overhead and may be time consuming or difficult. Additionally, it may be desirable to secure and encrypt the communication link 150, 160 between the access point 105 and the controller 110 in order to prevent unauthorized access and tampering with the access point 105 (such as manipulating routing tables of the access point 105 to gain surreptitious access to data plane traffic).

One example of a communication link that may be both long-lasting and encrypted is a secured tunnel, such as a Secure Shell (SSH) tunnel. A secured tunnel may be used to transport traffic over an encrypted connection. The traffic may include, for example, any (arbitrary) data communicable over a Transmission Control Protocol (TCP) port.

In a secured tunnel configuration, the access point 105 may operate secured tunnel client (STC) software 106, and the controller 110 may operate secured tunnel server hardware (e.g., secured tunnel server (STS) 112). One example secured tunnel client 106 is SSH, and one example secured tunnel server 112 is SSHD, although the present disclosure is not limited thereto.

With tunneling enabled, software operating on the access point 105 may contact a local port (e.g., a localhost port) on which the secured tunnel client 106 is listening. The secured tunnel client 106 then forwards the application over an encrypted tunnel to the secured tunnel server 112 operating on the controller 110. The secured tunnel server 112 then forwards the data to the actual destination application, in this case control plane and/or management plane software 111. In some embodiments, management plane software may not be executed on each controller 110, and may instead be executed on the master controller, or a different device altogether.

Using a secured tunnel may provide various advantages to the access point 105 and controller 110 and to facilitating management and control of the devices of the networking system 100. For example, a single secured tunnel may facilitate multiple different types of traffic (separated onto different ports) between the access point 105 and the controller 110, which may in particular enable the abstraction of the connection and many of the connection details for various software components on the access point 105 and/or the controller 110. For example, different software processes on the access point 105 may not need to retrieve the specific network address of the controller 110, and instead may need only to communicate their traffic to a respective port on a local end of the secured tunnel (e.g., the 'localhost' port) on which the secured tunnel client 106 is listening. This port-separated traffic may be then carried to the secured tunnel server 112 on controller 110 via the single secured tunnel, and communicated to the appropriate software component on the controller 110. Similarly, the various software components of the controller 110 need only provide their traffic to a local port on the local end (i.e., the controller end) of the tunnel for communication to the access point 105.

The present disclosure is based on a recognition of various challenges in adopting of microservices-based architecture technologies and/or operating-system level virtualization technologies in various computer and networking systems, such as the example networking system 100 of FIG. 2. These challenges are discussed within the context of FIGS. 3A and 3B, which illustrate one potential way the collection 120 of controllers 110 of the networking system of FIG. 2 may be implemented as a system of cloud-based software controllers. The cloud-based software controllers may be implemented in an operating system-level virtualized environment as part of a cloud-based networking configuration service.

Figure 3A:
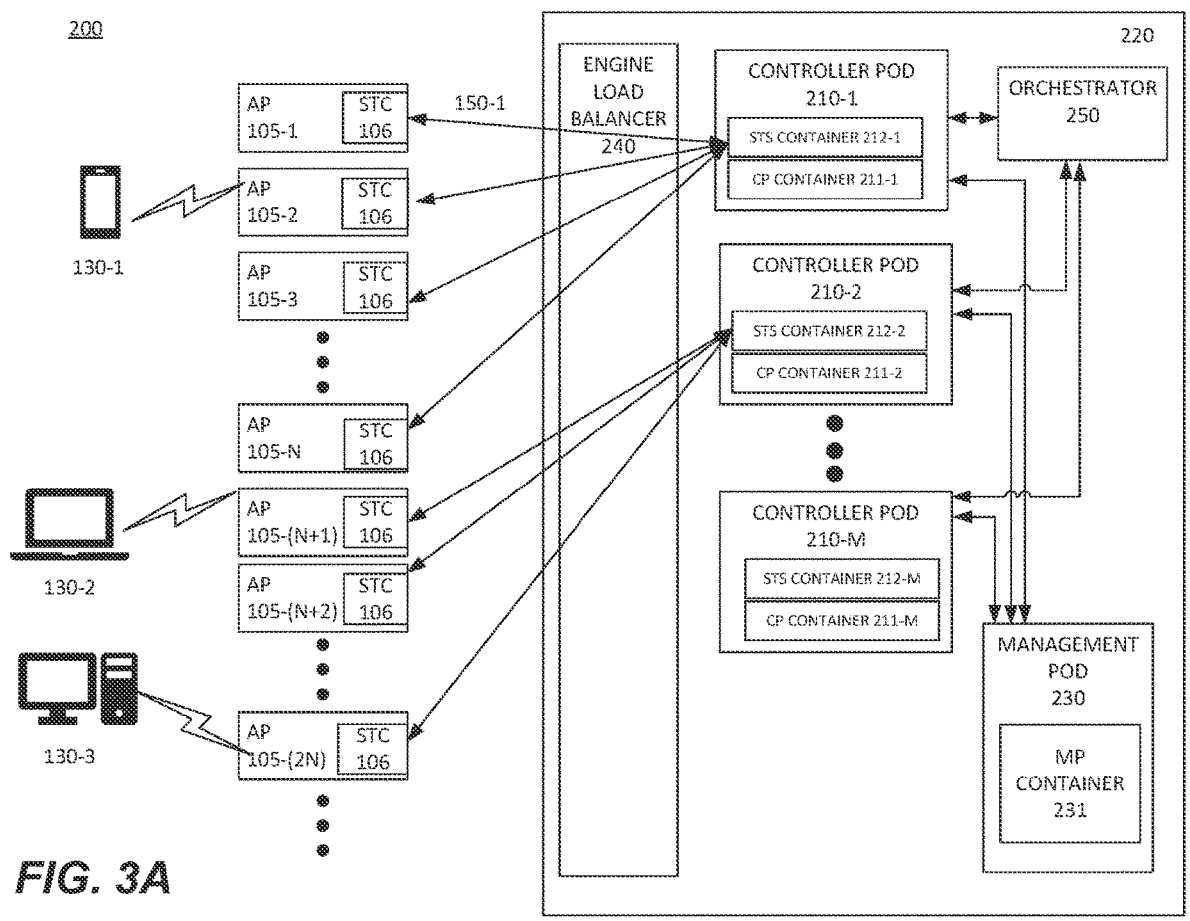
FIGS. 3A and 3B are block diagrams illustrating one adaption of the networking system of FIG. 2 using containerized components.

In the networking system 200 of FIG. 3A, an orchestrated cluster 220 comprising one or more controller container groups (or pods) 210 may be provided. Additionally, at least one management pod 230 may be provided.

The orchestrated cluster 220 may be configured and provided by a container orchestration platform (e.g., Kubernetes). In some embodiments, the container orchestration platform may be provided as a service offering from a platform as a service (PaaS) or infrastructure as a service (IaaS) vendor that manages the nodes (the physical machines or virtual machines that act as worker machines) on which the pods 210 and 230 are instantiated and operated. In some embodiments, the container orchestration platform may be implemented "on-premises" at a central location or data center of the operator of the networking system 200 in which the nodes are deployed at the central location or data server. In some embodiments, the orchestrated cluster 220 may be instantiated and operated in a local cloud. For ease of illustration, the nodes are not illustrated in FIG. 3A.

The container orchestration platform (and hence the orchestrated cluster 220) may provide an orchestrator 250, which may be used to define the containers of each pod 210 and 230, control the deployment of pods 210 and 230 on the nodes (worker machines or computer devices present within a system), and manage the lifecycle of the pods 210 and 230 and the containers thereof. For example, the orchestrator 250 may include an application programming interface (API) that enables the manipulation of various objects within the orchestrated cluster 220. The container orchestration platform (and hence the orchestrated cluster 220) may also provide an engine load balancer 240, which may provide default load balancing and other ingress services that enable selection between one or more pods.

Each controller pod 210 may be a pod or container group comprising one or more containerized components that communicate with each other and are installed on the same node. As seen in FIG. 3A, each controller pod 210 may include a secured tunnel server container 212 in which the secured tunnel server 112 is instantiated and/or executed. Each controller pod 210 may also include a control plane container 211 in which control plane software for the access points 105 is instantiated and/or executed. Controller pod 210 may include a secured tunnel server container 212 in which the secured tunnel server 112 is instantiated and/or executed. The at least one management pod 230 may include a management plane container 231 in which the management plane software for the access points 105 and/or for the controllers 210 is instantiated and/or executed.

The networking system 200 of FIG. 3A provides some advantages and improvements over the networking system 100 of FIG. 2. For example, it may be seen that the management pod 230 may be separate from the controller pods 210, and hence the management plane software may be separated from the control plane software. This may enable each to scale differently (e.g., one management pod 230 may be deployed for multiple controller pods 210) and freeing system resources by reducing a size or memory usage of each controller pod 210. This may also enable quicker deployment of software updates to the software of each pod, as the different software engineering teams that may be responsible for the software of each pod may no longer need to coordinate release schedules. As another advantage, it may be comparatively more difficult to scale the networking system 100 and/or deploy additional access points 105 than it is to do so in networking system 210. Each controller 110 may be configured to manage only a set number of access points 105, and exceeding the total number of access points 105 for the cluster 120 (that is, the sum of the number of access points managed by each controller 110) may require the purchase of additional hardware and/or software to instantiate a new controller 110 instance, prior to performing any configuration of the access points 105. This may be a costly and/or time-consuming process. In contrast, in the networking system 200 of FIG. 3A, a new controller pod 210 may be instantiated and integrated into the orchestrated cluster 220 relatively quickly.

However, the networking system 200 of FIG. 3A may also suffer from potential drawbacks arising from adapting the collection 120 and the controllers 110 thereof to be implemented in an operating system-level virtualized environment as part of a cloud-based networking configuration service. For example, as discussed above, various software operating on already-deployed access points 105 may have an implicit expectation that they need only to communicate both their management plane and control plane traffic to respective specific port at an access point-end of the secured tunnel (e.g., the 'localhost' port). The result of the topology in networking system 200 is that the controller pods need to act as a go-between for management plane traffic communicated between the access points 105 and the management pod 230, since only the controller pods 210 hold the secured tunnel server software in their containers 212, and hence only the controller pods 210 provide the cluster-end of the secured tunnel.

Another potential drawback stems from interactions between the secured tunnel server software running in secured tunnel server containers 212, the engine load balancer 240, and the orchestrator 250. The engine load balancer 240 and orchestrator 250, which again may be a default engine load balancer and default orchestrator, may have an implicit expectation that the incoming traffic is stateless (e.g., may be handled by any appropriate pod) and relatively lightweight (e.g., that connections are relatively temporary). In contrast, the communications links are relatively long-lasting and the control plane software in containers 211 may be stateful, and as such may require a long-term connection between an access point 105 and a single controller pod 210. Use of the engine load balancer 240 and orchestrator 250 may result in an unbalanced number of connections between a first controller pod 210-1 and a second controller pod 210-2, with earlier-deployed access points 105 assigned to the first controller pod 210-1 and later-deployed access points 105 assigned to second controller pod 210-2.

Figure 3B:
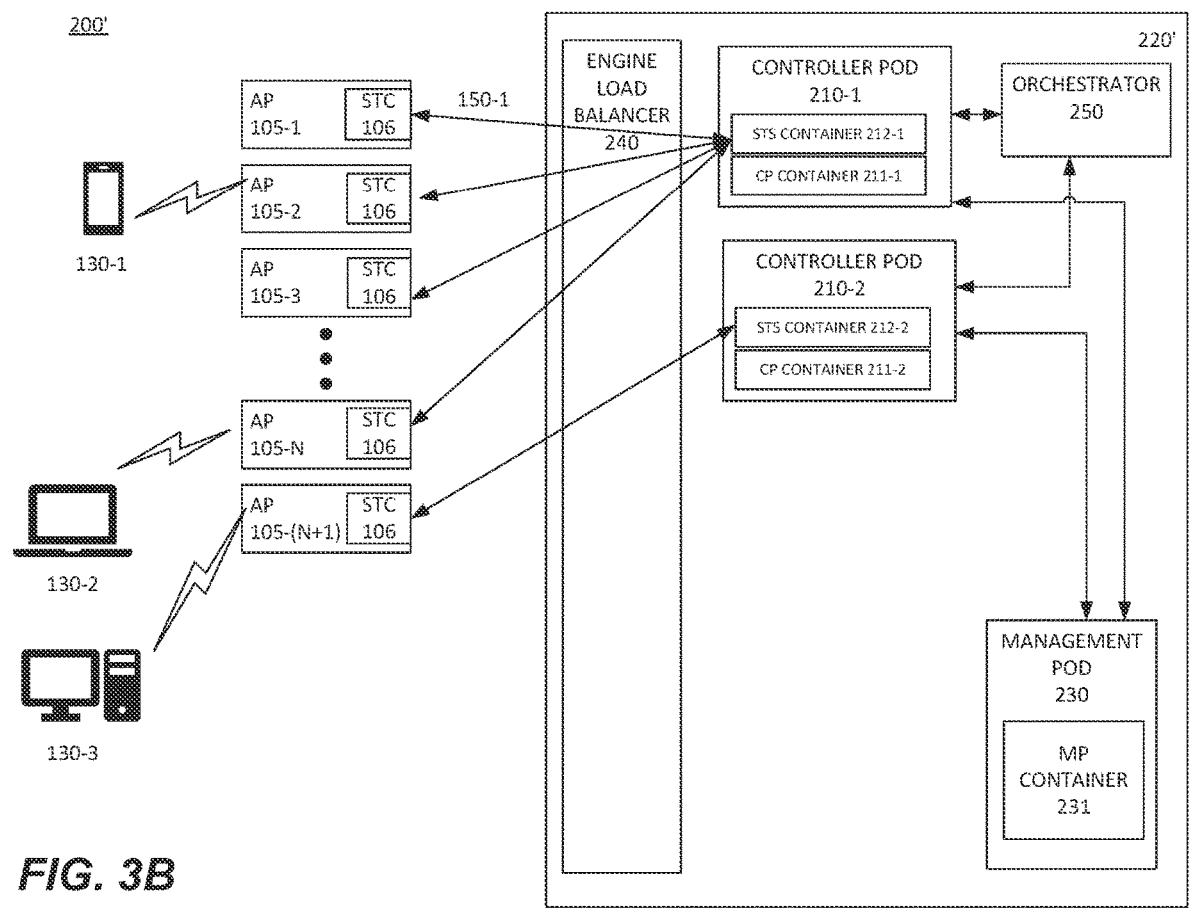

An extreme example of such unbalancing is shown in FIG. 3B. Each controller pod 210 may be configured to handle and control a predetermined number of access points 105 (e.g., 10,000 access points 105). In the example networking system 200' of FIG. 3B, initially a number of access points that is equal to this predetermined number of access points (e.g., 10,000 access points 105) are deployed, and a single controller pod 210-1 is instantiated to service these access points. Subsequently, a later access point 105 that is one more than this predetermined number of access points 105 is deployed (e.g., a 10,001th access point 105 is deployed). This results in instantiation of a second controller pod 210-2. A result from operation of the engine load balancer 240 and orchestrator 250 is that all of the first predetermined number of access points (e.g., the first 10,000 access points 105) are handled by the first controller pod 210-1 of orchestrated cluster 220', and the single remaining access point (e.g., the 10,001th deployed access point 105) is managed by the second controller pod 210-2. On the other hand, although two controller pods 210-1 and 210-2 may be initially deployed (and the engine load balancer 240 may select therebetween) in an attempt to predict future deployment of access points 105, it is noted that this may result in lower network efficiency and lower resource utilization, since up until the "extra" access point 105 is deployed, the average utilization of the controller pods 210-1 and 210-2 is at 50%.

The identified drawbacks of the networking system 200 may delay or slow adoption of a microservices-based architecture and/or operating-system level virtualization technologies and/or may result in lower network efficiency, lower resource utilization, and increased time to develop software features for cloud-based controllers. Some embodiments of the inventive concepts, which may promote increased adoption of a microservices-based architecture and/or operating-system level virtualization technologies, and which may result in increased network efficiency, increased resource utilization, and decreased time to develop software features for cloud-based controllers are discussed below with reference to FIGS. 4-7.

Figure 4:
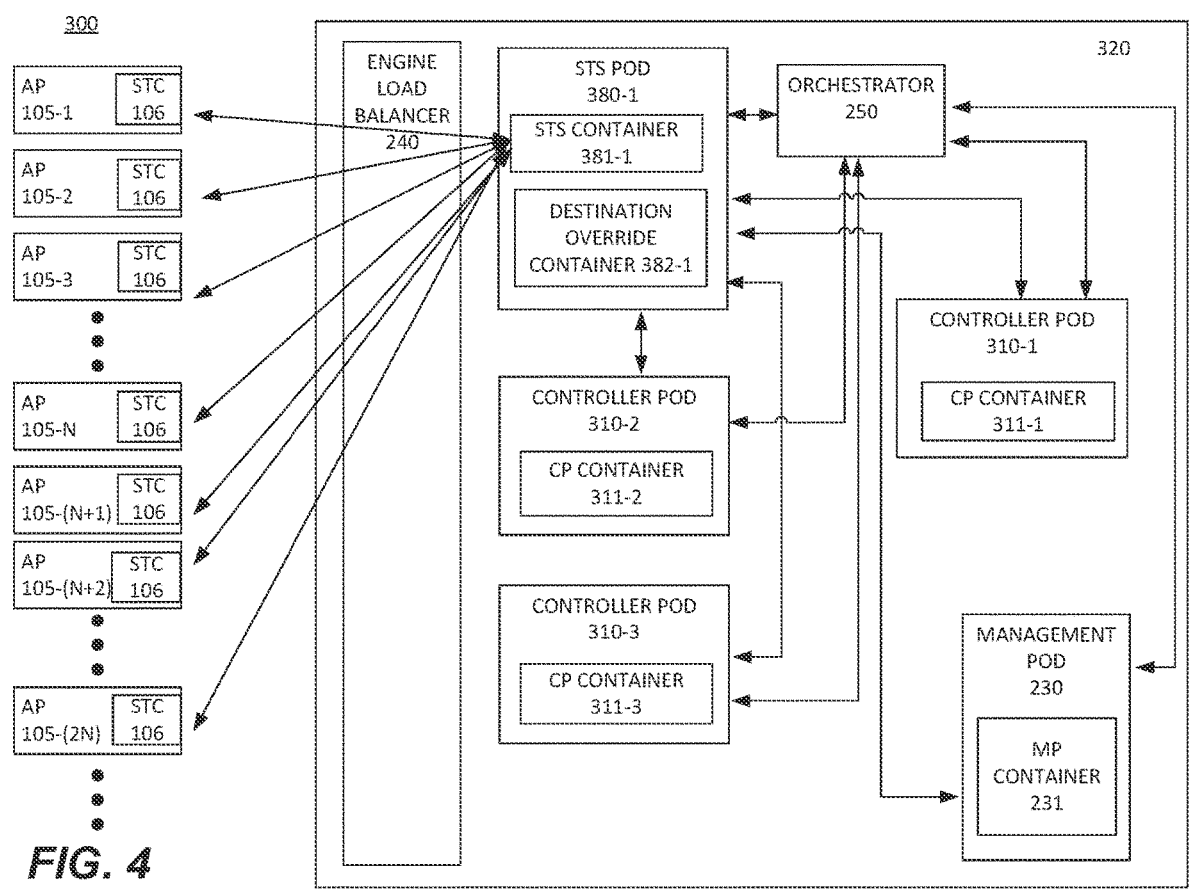
FIG. 4 is a block diagram illustrating a networking system that uses containerized components according to some embodiments of the present inventive concepts.

FIG. 4 is a block diagram illustrating a networking system 300 that uses containerized components according to some embodiments of the present inventive concepts. In the networking system 300 of FIG. 4 and in the orchestrated cluster 320 thereof, the secured tunnel server software is broken out from the controller pod 310 into its own secured tunnel server pod 380-1 and into a secured tunnel server container 381 thereof. In other words, the secured tunnel server is decoupled from the control plane software running in control plane container 311 and in controller pod 310, and from the management plane software running in management plane container 231 and in management pod 230.

The secured tunnel server software (and the secured tunnel server container 381) may coexist in the secured tunnel server pod 380 with destination override software running in a destination override container 382. The destination override software may be configured to provide the secured tunnel server software with information to override a destination from an original target and an original port to an override target and an override port elsewhere within the orchestrated cluster 320.

As discussed above, already deployed access points 105 may expect to communicate their traffic to a respective port on a local end of the secured tunnel on which the secured tunnel client 106 is listening. This port-separated traffic may be then carried to the secured tunnel server 112 on controller 110 via the single secured tunnel, and communicated to the appropriate software component on the controller 110. In some embodiments, this local port forwarding is established by providing, at creation of the secured tunnel, a flag and three-tuple comprising the local port, the remote host, and the remote port to which local port traffic is to be forwarded. An example of such a flag and three-tuple may be '−L 8883:localhost:1884', where '−L' is the flag for local port forwarding, 8883 is the local port, 1884 is the target port, and 'localhost' is the target name, which in the case of local port forwarding is relative to the secured tunnel server. In other words, '−L 8883:localhost:1884' indicates that client traffic received on port 8883 (of the client, that is the access point 105) should be communicated to a destination of port 1884 on the secured tunnel server.

The access point 105 may include a number of flag and three-tuple combinations, each corresponding respectively to a different software component that communicates with the controller. For example, a first software component may use '−L 8883:localhost:1884' as discussed above, while a second software component may use '−L 9191:localhost:9191' indicating that client traffic received on port 9191 (of the client, that is the access point 105) should be communicated to a destination of port 9191 on the secured tunnel server.

The secured tunnel server software in secured tunnel software container 381 and the destination override software in the destination override container 382 may be configured to override this destination, resulting instead in the traffic arriving at a different location in the orchestrated cluster 320 than port 1884 on the secured tunnel server.

The secured tunnel server software in secured tunnel software container 381 may be configured to receive, from the destination override software in the destination override container 382, a mapping of original target name and original target port to override target name and override target port. In some embodiments, the override target name may identify a specific pod (e.g., first controller pod 310-1). In some embodiments, the override target name may identify a service. A service may be a group of pods, each of which provides an identical functionality; for example, in FIG. 4, the first controller pod 310-1, second controller pod 310-2, and third controller pod 310-3 may be part of a controller service. Overriding a target name with a service instead of a specific pod identifier may enable the secured tunnel server software in secured tunnel software container 381 to load balance among the pods of the service.

The mapping may also indicate an algorithm to use while load balancing among the pods of the service. The algorithm to use may depend on whether the service has been implemented as a stateful service (e.g., where it is preferential or required that subsequent communication be with the same pod of the service) or stateless (e.g., where communication may be with any pod of the service). Some examples of load balancing algorithms include random, least-cpu, least-mem, and native. In some embodiments, the "random," "least-cpu," and "least-mem" algorithms are used for stateful services, and the "native" load balancing algorithm is used for stateless services.

Designation of the "random" algorithm may indicate that when a connection request or traffic is received from an access point 105, the secured tunnel server software in secured tunnel software container 381 should select a pod of the service randomly (e.g., the first controller pod 310-1, second controller pod 310-2, and third controller pod 310-3). The designation of the "random" algorithm further indicates that subsequent traffic from the access point 105 should be forwarded to the selected pod.

Designation of the "least-cpu" algorithm may indicate that when a connection request or traffic for an identified port is received from an access point 105, instead of choosing a pod randomly, the secured tunnel software container 381 should pick the pod of the service reporting the lowest processor (CPU) usage. This information may be communicated to the secured tunnel software pod 380 by the orchestrator, in some embodiments via the destination override software in the destination override container 382. Similarly, designation of the "least-mem" algorithm may indicate that when a connection request or traffic for an identified port is received from an access point 105, instead of choosing a pod randomly, the secured tunnel software container 381 should pick the pod of the service reporting the lowest memory usage. This information may be communicated to the secured tunnel software pod 380 by the orchestrator, in some embodiments via the destination override software in the destination override container 382. The designation of either the "least-cpu" or "least-mem" algorithm further indicates that subsequent traffic from the access point 105 should be forwarded to the selected pod.

Designation of the "native" algorithm may indicate that when a connection request traffic for an identified port is received from an access point 105, the secured tunnel server software should employ the engine load balancer 240 of the orchestrated cluster 320 (e.g., the load balancing mechanism provided as part of container orchestration platform). As discussed above, this load balancer may be desirable for use for stateless services.

From the above, it may be seen that different original target name and target port combinations may be mapped to different override target name and target port combinations, and different mappings may use different algorithms. For example, consider two local port forwardings three-tuples on an access point 105, '8083:localhost:8083' and '9191:localhost:9191.' Respective mappings for these three-tuples may be 'localhost:9191→cp:9191:least-mem' and 'localhost: 8083→mp:8083:random'.

The first mapping may indicate that traffic received by the secured tunnel server in container 381 on port 9191 should be forwarded to the control plane (cp) service on port 9191, with the pod thereof selected based on which pod is currently reporting a lowest memory usage. Accordingly, the appropriate pod may be selected and the traffic may be forwarded to the selected pod via a secured tunnel between the secured tunnel pod 380 and the selected pod.

The second mapping may indicate that traffic received by the secured tunnel server in container 381 on port 8083 should be forwarded to the management plane (mp) service on port 8083, with the pod thereof selected randomly. Accordingly, the appropriate management plane pod may be selected and the traffic may be forwarded to the selected pod, as discussed above. It may be observed that this configuration avoids the need for the controller pods 310 to act as a go-between for management plane traffic communicated between the access points 105 and the management pod 230, since the controller pods 210 no longer hold the secured tunnel server software in their containers 212, and hence no longer provide the cluster-end of the secured tunnels.

The deployment and configuration of the secured tunnel pod 380 and the software operating therein may reduce or eliminate a need to redeploy and/or reconfigure the access points 105, as the mapping and overriding of traffic destinations within the orchestrated cluster 320 is essentially invisible from the perspective of the access points 105.

The deployment and configuration of the secured tunnel pod 380 and the software operating therein may also enable software engineers (or software engineering teams) to select between stateful design and stateless design as needed. For example, a first development team may be tasked with maintaining a mature software product originally configured for stateful design. The availability of the "random," "least-cpu," and "least-mem" algorithms may enable the first development team to migrate the software product to the orchestrated cluster 320 without substantial reconfiguration. Separately, a second development team may implement a new software product and may select a stateless design for which the 'native' load balancing algorithm of the engine load balancer 240 is appropriate or preferred.

Figure 5:
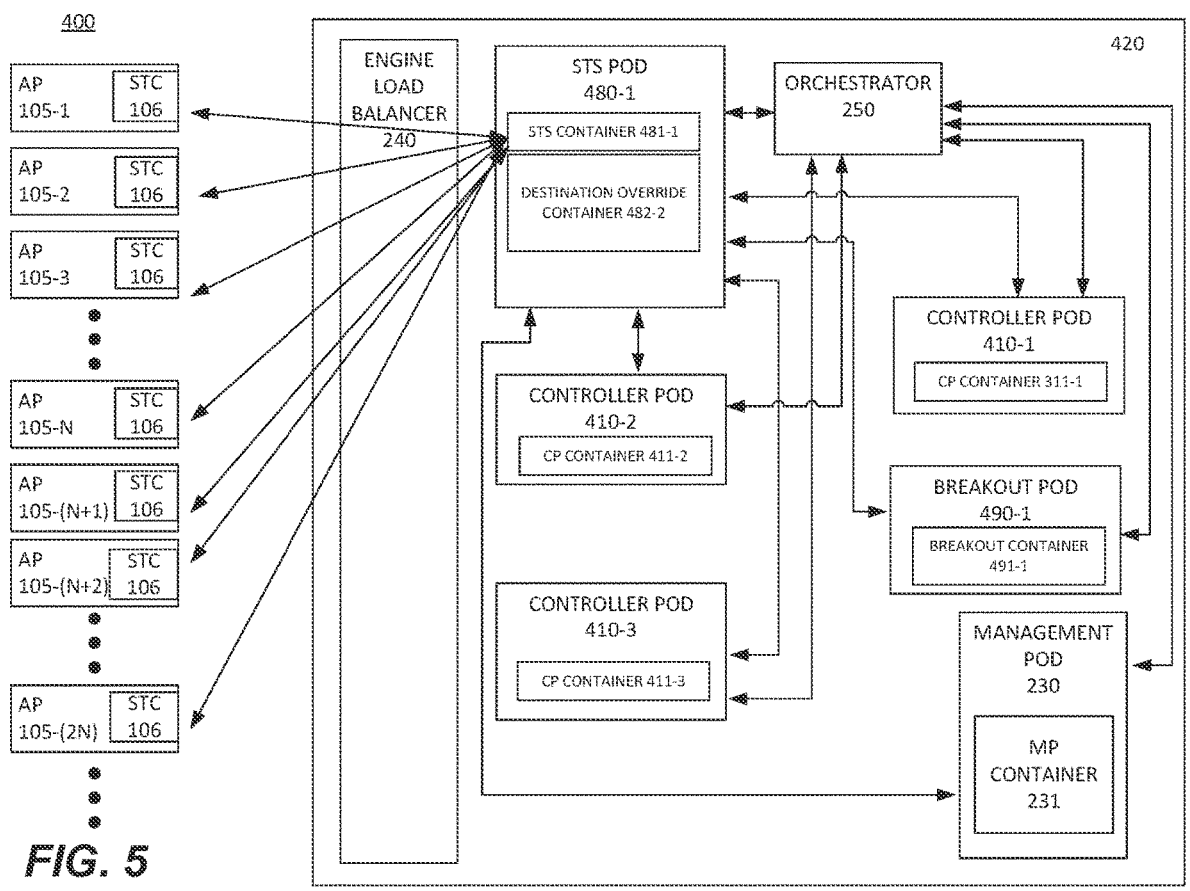
FIG. 5 is a block diagram illustrating a networking system that uses containerized components according to some embodiments of the present inventive concepts.

FIG. 5 is a block diagram illustrating additional benefits of a networking system 400 that uses containerized components according to some embodiments of the present inventive concepts. As seen in FIG. 5, in the networking system 400, some existing software functionality (that was previously part of the controller pods 310 of FIG. 4) may be separated from the controller pods 410 into a separate breakout pod 490 within the orchestrated cluster 420. This breakout functionality may communicate with the access points 105. Rather than redeploy and/or reconfigure the access points 105, the breakout pod 490 may be deployed and communicated with by changing the mapping and overriding of traffic destinations within the orchestrated cluster 420 from a first mapping to a second mapping.

For example, in the networking system 300 of FIG. 4, the breakout software may be communicated with using a first mapping of "localhost:7979→cp:7979:random", indicating that the traffic received by the secured tunnel server in container 381 on port 7979 should be forwarded to the control plane (cp) service on port 7979, with the pod thereof selected randomly. As part of migrating from the networking system 300 of FIG. 4 to the networking system 400 of FIG. 5, the mapping may be changed from a first mapping to a second mapping of "localhost:7979→bp:7979:random", indicating that the traffic received by the secured tunnel server in container 481 on port 7979 should be forwarded to the breakout pod (bp) service on port 7979, with the pod selected randomly.

Figure 6A:
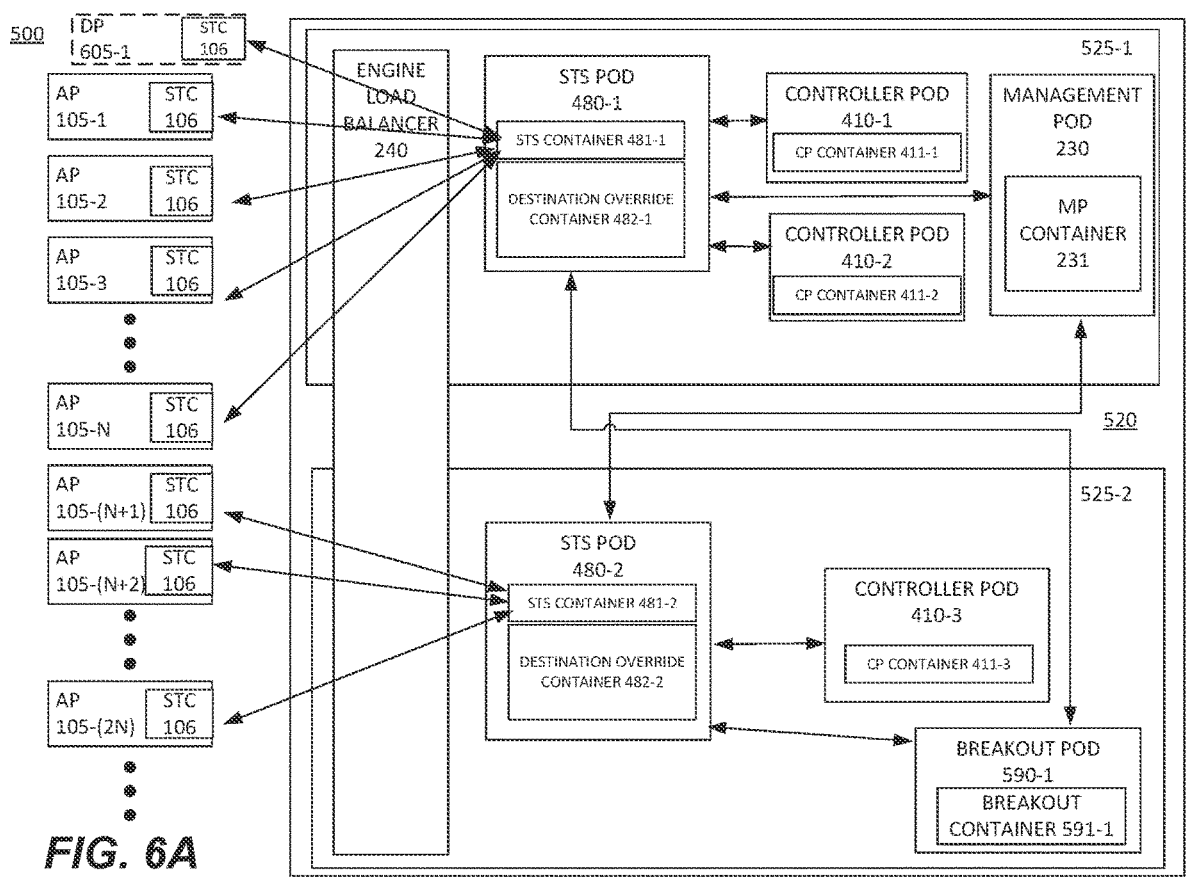
FIGS. 6A and 6B are block diagrams illustrating a networking system that uses containerized components according to some embodiments of the present inventive concepts.
Figure 6B:
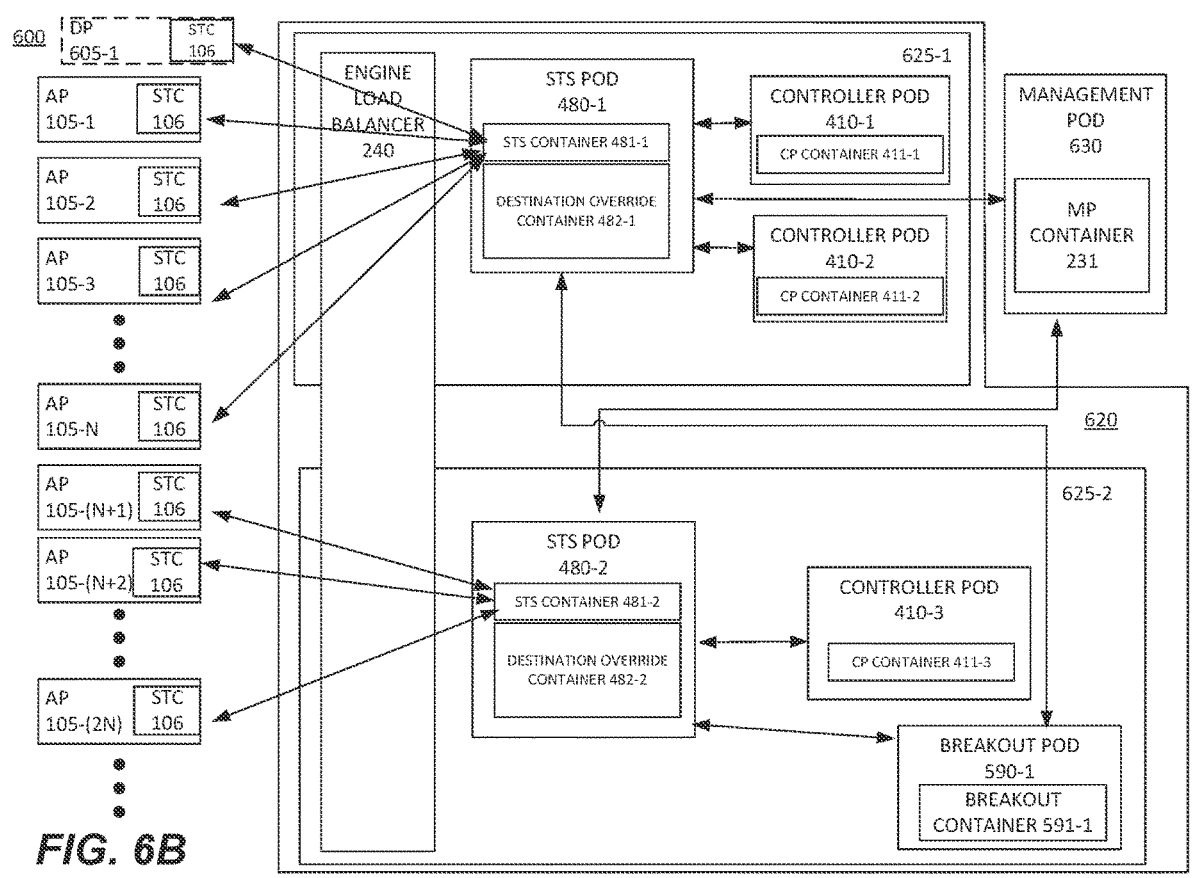

FIGS. 6A and 6B are block diagrams illustrating additional aspects of networking systems that use containerized components according to some embodiments of the present inventive concepts. In the networking system 500 of FIG.

6A, the container orchestration platform is provided as a service offering from a PaaS or IaaS vendor that manages the nodes 525 (the physical machines or virtual machines that act as worker machines) on which the pods 480, 410, 230, and 590 are instantiated and operated as part of an orchestrated cluster 520. An orchestrator may be present within the system 500 but is not shown in FIG. 6A for ease of illustration. It can be seen that although the different nodes 525-1 and 525-2 have different pods instantiated thereon, the secured tunnel software pods 480 therein can communicate with at least one pods of each service of the orchestrated cluster 520.

In the networking system 600 of FIG. 6B, the container orchestration platform may be implemented "on-premises" at a central location or data center of the operator of the networking system 600 in which the nodes 625 are deployed at the central location or data server. An orchestrator may be present within the system 600 but is not shown in FIG. 6B for ease of illustration. It can be seen that although the different nodes 625-1 and 625-2 have different pods instantiated thereon, the secured tunnel software pods 480 therein can communicate with at least one pods of each service of the orchestrated cluster 620. Additionally, each secured tunnel software pod 480 can communicate with a management pod 630 or other pad that may not be part of the orchestrated cluster 620.

FIGS. 6A and 6B also show that because the controller pods 410 do not act as a go-between for management plane traffic communicated to the management pods 230 and 630, other devices or products that may be managed via the management pods 230 and 630 may connect thereto via the orchestrated clusters 520 and 620. For example, data plane product 605 may be an on-premises appliance configured to manage data plane traffic (e.g., for communication to a network such as the Internet). Enabling a connection from the data plane product 605 to the management pods 230 and 630 via the orchestrated clusters 520 and 620 may enable seamless and/or "one plane of glass" management of the data plane product 605 without using resources dedicated to the controller pods 410. The handling of the management plane traffic for the data plane product 605 may be communicated to the management pod via a mapping managed by the destination override software of destination override containers 482. For example, a mapping of "localhost: 7979→mp:7979:random", indicating that the traffic received on port 7979 from the data plane product 605 by the secured tunnel servers in containers 481 should be forwarded to the management plane (mp) service on port 7979, with the pod thereof selected randomly.

Figure 7:
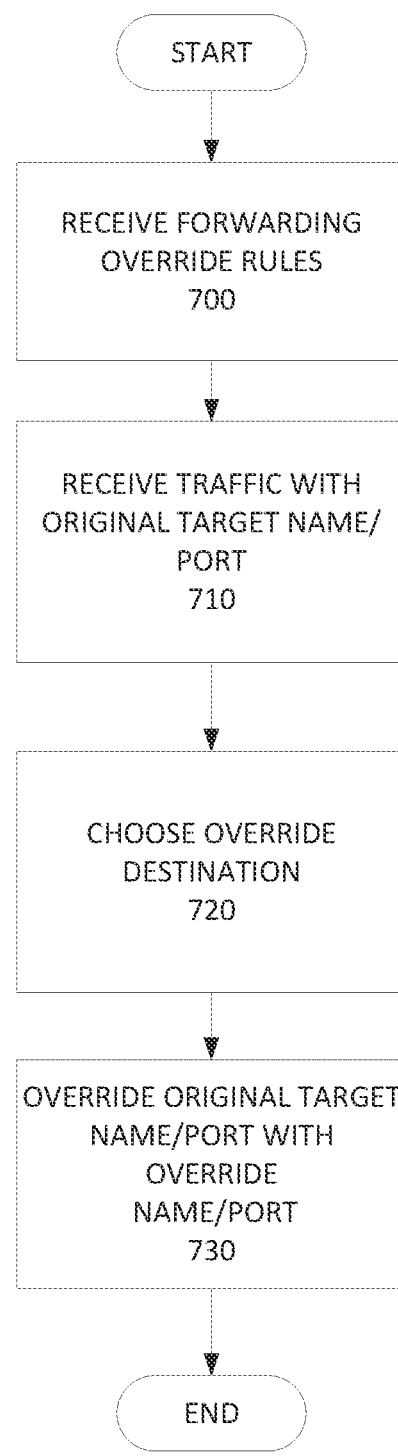
FIG. 7 is a flowchart illustrating aspects of methods of overriding a forwarding target for traffic in a networking system that uses containerized components according to some embodiments of the present inventive concepts.

FIG. 7 is a flowchart illustrating aspects of methods of overriding a forwarding target for traffic in a networking system that uses containerized components according to some embodiments of the present inventive concepts. In FIG. 7, the secured tunnel server software (operating, e.g., within containers 381 or 481) may receive a plurality of override rules in operation 700. Each override rule may provide a mapping between a first destination indicated by original target name and an original target port and an override destination indicated by an override target name and an override target port. The override target name may indicate a service and/or the override target name may indicate a plurality of potential destinations. Each potential destination may be a containerized software component. Each potential destination may be a group or pod of containerized software components each installed in common on a common operating system. Each containerized software component of the group may be instantiated in a common container platform. The mapping may also indicate an algorithm to be used to select one destination from among the plurality of potential destinations. The secured tunnel software may be operating as a containerized software component, and the mapping may be received from a second containerized software component (e.g., destination override container 382 and 482)

The secured tunnel server software may receive traffic on an original target name and original target port (operation 710). Upon receipt thereof, the secured tunnel server software may select an override destination (operation 720). For example, when the override target name indicates a service and/or the override target name indicates a plurality of potential destinations, the secured tunnel server software may select the one destination based on the algorithm indicated by the mapping. As discussed above, and as examples, the indicated algorithm may indicate a "random" algorithm, or may indicate a "least-cpu" or "least-mem" algorithm. In some embodiments, data may be received (e.g., from destination override container 382 and 482) indicating a processor usage and/or memory usage of containerized software components operating at each potential destination and the secured tunnel server software may use the data to select the one destination. In some embodiments, the indicated algorithm may indicate that a native load balancer should select the one destination. In some embodiments, choosing an override destination may be based on a previous selection of an override destination.

In operation 730, and based on the selection of the override destination, the secured tunnel server software may forward the traffic to the override name and override port.

Figure 8:
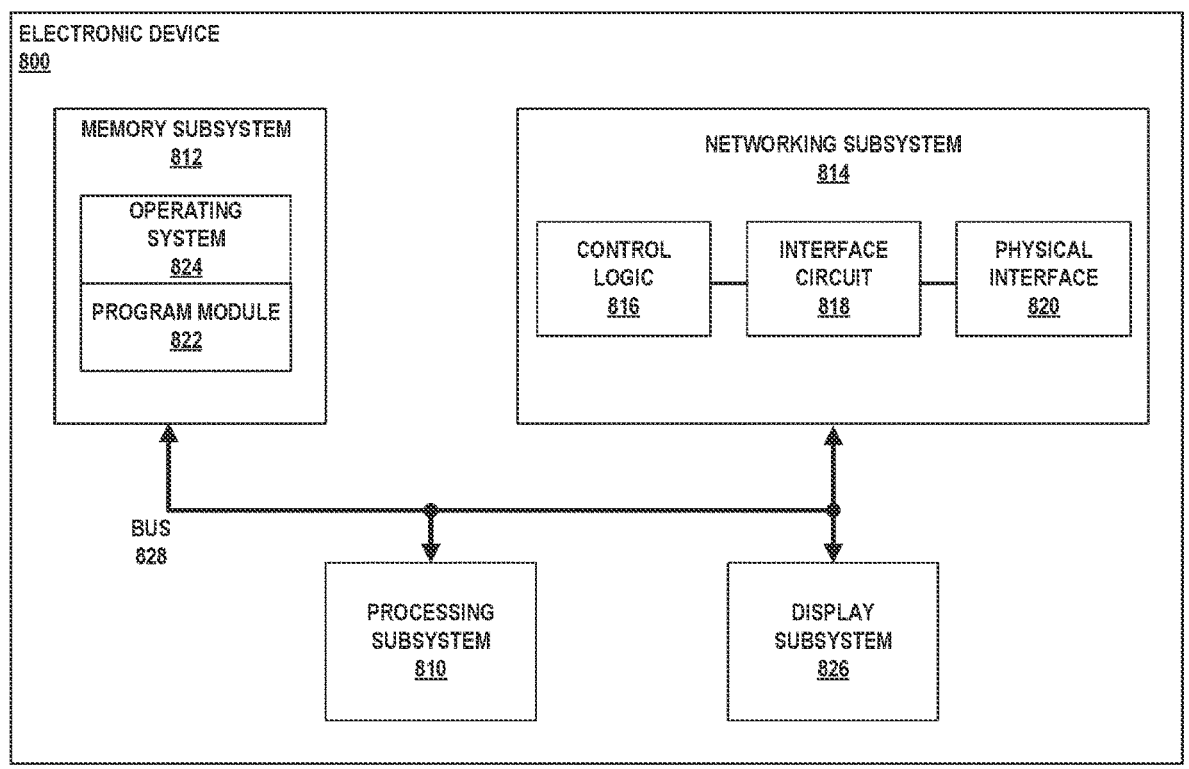
FIG. 8 is a block diagram illustrating an electronic device in accordance with an embodiment of the present disclosure.

FIG. 8 provides a block diagram of an example of an electronic device, aspects or components of which may be present in the various electronic devices described herein (e.g., the network-enabled computing devices 130, the access points 105, the controller 110, the nodes or computing devices on which the containers, pods, and/or orchestrator of clusters 220, 221, 320, 420, 520, 620, and 621 are running, and so on). FIG. 8 presents a block diagram illustrating an electronic device 800 in accordance with some embodiments. The electronic device 800 may include a processing subsystem 810, a memory subsystem 812, and a networking subsystem 814.

The processing subsystem 810 may include one or more devices configured to perform computational operations. For example, the processing subsystem 810 can include one or more microprocessors, ASICs, microcontrollers, programmable-logic devices, and/or one or more digital signal processors (DSPs).

The memory subsystem 812 may include one or more devices for storing data and/or instructions for the processing subsystem 810 and/or the networking subsystem 814. For example, the memory subsystem 812 can include dynamic random access memory (DRAM), static random access memory (SRAM), and/or other types of memory. In some example embodiments, instructions for the processing subsystem 810 stored in the memory subsystem 812 include: one or more program modules or sets of instructions (such as a program module 822 or an operating system 824), which may be executed by the processing subsystem 810. Note that the one or more computer programs may constitute a computer-program mechanism. In some embodiments, the memory subsystem 812 may be coupled to or may include one or more storage devices (not shown). For example, the memory subsystem 812 can be coupled to a magnetic or optical drive, a solid-state drive, or another type of mass-storage device. In these embodiments, the memory subsystem 812 can be used by electronic device 800 as fast-access storage for often-used data, while the storage device is used to store less frequently used data.

The networking subsystem 814 may include one or more devices configured to couple to and communicate on a wired and/or wireless network (i.e., to perform network operations), including: control logic 816, an interface circuit 818 and one or more interfaces 820 (e.g., ports, antennas, antenna elements). For example, the networking subsystem 814 can include an Ethernet networking system, a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi networking system), and/or another networking system. The networking subsystem 814 may include processors, controllers, radios/antennas, sockets/plugs, and/or other devices used for establishing a connection using each supported networking system, coupling to each supported networking system, communicating on each supported networking system, and handling data and events for each supported networking system. Note that mechanisms used for establishing connections, coupling to networks, communicating on networks, and handling data and events on the network for each network system are sometimes collectively referred to as a 'network interface' for the network system.

Within an electronic device 800, the processing subsystem 810, the memory subsystem 812, and the networking subsystem 814 may be coupled together using a bus 828. The bus 828 may include an electrical, optical, and/or electro-optical connection that the subsystems can use to communicate commands and data among one another. Although only one bus 828 is shown for clarity, different embodiments can include a different number or configuration of electrical, optical, and/or electro-optical connections among the subsystems.

In some embodiments, electronic device 800 may include a display subsystem 826 for displaying information on a display (not shown), which may include a display driver and the display, such as a liquid-crystal display, a multi-touch touchscreen, etc.

The electronic device 800 can be (or can be included in) any electronic device with at least one network interface. For example, the electronic device 800 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a controller, a router, a switch, communication equipment, test equipment, and/or another electronic device.

Although specific components are used to describe the electronic device 800, in some example embodiments, different components and/or subsystems may be present in electronic device 800. For example, the electronic device 800 may include one or more additional processing subsystems, memory subsystems, networking subsystems, and/or display subsystems. Additionally, one or more of the subsystems may not be present in an example electronic device 800. Moreover, in some embodiments, the electronic device 800 may include one or more additional subsystems that are not shown in FIG. 8. Also, although separate subsystems are shown in FIG. 8, in some embodiments some or all of a given subsystem or component can be integrated into one or more of the other subsystems or component(s) in an electronic device 800. For example, in some embodiments the program module 822 may be included in the operating system 824 and/or the control logic 816 may be included in the interface circuit 818.

The foregoing descriptions of embodiments of the present disclosure have been presented for purposes of illustration and description only. They are not intended to be exhaustive or to limit the present disclosure to the forms disclosed. Accordingly, many modifications and variations of the inventive concepts will be apparent to those skilled in the art, and the inventive concepts defined herein may have applicability to other embodiments and applications without departing from the scope of the present disclosure.

What is claimed is:

1. A method comprising:
    instantiating an instance of a first containerized software component within an orchestrated cluster, wherein the first containerized software component is configured to provide a secured tunnel server;
    instantiating a plurality of instances of a second containerized software component within the orchestrated cluster;
    receiving, by the secured tunnel server and via a secured tunnel, network traffic intended for a first original destination;
    selecting, based on a plurality of override rules, an override destination for the network traffic intended for the first original destination, wherein selecting the override destination for the network traffic intended for the first original destination comprises selecting one of the plurality of instances of the second containerized software component within the orchestrated cluster; and
    forwarding, by the secured tunnel server, the network traffic to the selected override destination,
    wherein the network traffic intended for the first original destination is received from a wireless access point and comprises control plane traffic.

2. The method of claim 1, further comprising receiving, by the secured tunnel server, data related to each of the plurality of instances of the second containerized software component within the orchestrated cluster, and wherein selecting one of the plurality of instances of the second containerized software component within the orchestrated cluster is based on the received data.

3. A method comprising:
    operating an orchestrated cluster comprising a plurality of containerized software components, wherein the plurality of containerized software components includes at least one instance of a first containerized software component that is configured to provide a secured tunnel server and a plurality of instances of a second containerized software component configured to control and/or manage wireless access points;
    receiving, by the secured tunnel server and via a secured tunnel, first network traffic from a wireless access point addressed to a port on the secured tunnel server;
    selecting, based on a plurality of override rules, one of the instances of the second containerized software component for the first network traffic;
    forwarding, by the secured tunnel server, the first network traffic to the selected one of the instances of the second containerized software component;
    receiving, by the secured tunnel server and via a secured tunnel, second network traffic from the wireless access point addressed to the port on the secured tunnel server; and forwarding, by the secured tunnel server, the second network traffic to the selected one of the instances of the second containerized software component.

4. The method of claim 3, wherein selecting the one of the plurality of instances of the second containerized software component comprises selecting among the plurality of instances of the second containerized software component randomly.

5. A method comprising:
operating an orchestrated cluster comprising a plurality of containerized software components, wherein the plurality of containerized software components includes at least one instance of a first containerized software component that is configured to provide a secured tunnel server and a plurality of instances of a second containerized software component configured to control and/or manage wireless access points;
receiving, by the secured tunnel server and via a secured tunnel, first network traffic from a wireless access point addressed to a port on the secured tunnel server;
selecting, based on a plurality of override rules, one of the instances of the second containerized software component for the first network traffic;
forwarding, by the secured tunnel server, the first network traffic to the selected one of the instances of the second containerized software component; and
receiving, by the first containerized software component, data related to each of the plurality of instances of the second containerized software component, and wherein selecting the one of the plurality of instances of the second containerized software component is based on the received data.

6. The method of claim 5, wherein the received data regarding each of the plurality of instances of the second containerized software component comprises processor usage data for each of the plurality of instances of the second containerized software component.

7. The method of claim 6, wherein selecting the one of the plurality of instances of the second containerized software component comprises selecting an instance of the second containerized software component associated with a lowest processor usage from among the plurality of instances of the second containerized software component.

8. The method of claim 5, wherein the received data regarding each of the plurality of instances of the second containerized software component comprises memory usage data for each of the plurality of instances of the second containerized software component.

9. The method of claim 8, wherein selecting the one of the plurality of instances of the second containerized software component comprises selecting an instance of the second containerized software component associated with a lowest memory usage from among the plurality of instances of the second containerized software component.

10. The method of claim 5, further comprising:
receiving, by the secured tunnel server and via a secured tunnel, second network traffic from the wireless access point addressed to the port on the secured tunnel server; and
forwarding, by the secured tunnel server, the second network traffic to the selected one of the instances of the second containerized software component.

11. The method of claim 2, wherein the data related to each of the plurality of instances of the second containerized software components comprises processor usage data, and wherein selecting one of the plurality of instances of the second containerized software component within the orchestrated cluster comprises selecting an instance of the second containerized software component associated with a lowest processor usage from among the plurality of instances of the second containerized software component.

12. The method of claim 2, wherein the data related to each of the plurality of instances of the second containerized software components comprises memory usage data, and wherein selecting one of the plurality of instances of the second containerized software component within the orchestrated cluster comprises selecting an instance of the second containerized software component associated with a lowest memory usage from among the plurality of instances of the second containerized software component.

13. The method of claim 1, wherein the network traffic is first network traffic, the method further comprising:
receiving, by the secured tunnel server, second network traffic intended for the first original destination from the wireless access point and comprising further control plane traffic; and
forwarding, by the secured tunnel server, the second network traffic to the selected one of the instances of the second containerized software component.

\* \* \* \* \*